United States Patent
He et al.

(10) Patent No.: US 11,581,967 B2
(45) Date of Patent: Feb. 14, 2023

(54) WIRELESS CHANNEL SCENARIO IDENTIFICATION METHOD AND SYSTEM

(71) Applicant: WUHAN UNIVERSITY, Hubei (CN)

(72) Inventors: Yigang He, Hubei (CN); Shuguang Ning, Hubei (CN); Liulu He, Hubei (CN); Mingyun Chen, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 126 days.

(21) Appl. No.: 17/163,569

(22) Filed: Feb. 1, 2021

(65) Prior Publication Data
US 2021/0399817 A1 Dec. 23, 2021

(30) Foreign Application Priority Data
Jun. 17, 2020 (CN) .......................... 202010553067.3

(51) Int. Cl.
*H04B 17/391* (2015.01)
*H04B 17/336* (2015.01)
*H04W 24/06* (2009.01)

(52) U.S. Cl.
CPC ....... *H04B 17/3912* (2015.01); *H04B 17/336* (2015.01); *H04B 17/3911* (2015.01); *H04W 24/06* (2013.01)

(58) Field of Classification Search
CPC . H04W 24/06; H04B 17/3912; H04B 17/336; H04B 17/3911
See application file for complete search history.

(56) References Cited

U.S. PATENT DOCUMENTS 11,408,978 B2 * 8/2022 Wang .................. A61B 5/0816
2020/0334575 A1 * 10/2020 O'Shea ................. G06N 3/086

* cited by examiner

*Primary Examiner* — Natasha W Cosme
(74) *Attorney, Agent, or Firm* — JCIPRNET (57) ABSTRACT

The disclosure provides a wireless channel scenario identification method and system. The method includes: simulating different wireless channel scenarios to obtain a channel scenario baseband signal $y(t)_{pq}$; extracting a feature parameter of $y(t)_{pq}$, extracting an autocorrelation function $A_h(t)_{pq}$ and performing a Fourier transform thereon to obtain a power spectral density function $S(t)_{pq}$; normalizing $S(t)_{pq}$ to obtain a normalized channel scenario power spectral density function $\overline{S}(t)_{pq}$; designing a deep learning network and inputting $\overline{S}(t)_{pq}$ and a category label pair to train the deep learning network; and for a system with a channel scenario to be identified, collecting a passband signal at its receiving end, obtaining the normalized scenario power spectral density function $\widetilde{S}(t)_{pq}$, and using $\widetilde{S}(t)_{pq}$ as an input of the trained classifier, the output of the classifier being a label sequence of the channel scenario, and the channel scenario is effectively determined.

10 Claims, 10 Drawing Sheets

Normalized power spectral density function in the classical Rayleigh channel

FIG. 6A

Normalized power spectral density function in the Gaussian fading channel

FIG. 6B

Normalized power spectral density function in the flat fading channel

FIG. 6C

Normalized power spectral density function in the arched fading channel

WIRELESS CHANNEL SCENARIO IDENTIFICATION METHOD AND SYSTEM

CROSS-REFERENCE TO RELATED APPLICATION

This application claims the priority benefit of China application serial no. 202010553067.3, filed on Jun. 17, 2020. The entirety of the above-mentioned patent application is hereby incorporated by reference herein and made a part of this specification.

BACKGROUND

Technical Field

The disclosure relates to the field of wireless channel scenario identification in wireless communication, and more particularly, to a wireless channel scenario identification method and system.

Description of Related Art

The transmission quality of wireless communication is strongly related to the surrounding environment of wireless communication. Different wireless channel environments have different characteristics. Electromagnetic waves exhibit the multi-path effect by reflection, diffraction and refraction in the wireless channel transmission. Even in the same communication environment, due to the existence of the multi-path effect, there are differences in the transmission signals. When the same electromagnetic wave signal passing through different paths is received at the receiving end, different multi-path delays and number of multi-paths are obtained. Due to the existence of the multi-path effect, there are differences in real scenarios, which leads to differences in unit impulse responses of different wireless channel scenarios. Moreover, the signal in the wireless channel is accompanied by large-scale fading, small-scale fading and the Doppler effect, which makes the modeling and research of wireless channels very complicated. By identifying different wireless channel scenario categories, it is possible to combine appropriate physical layer technologies to match different wireless channel scenarios, thereby improving the quality of wireless communication. Therefore, it is very meaningful and necessary to study a wireless channel scenario identification method.

In order to solve the identification problem of additive noise channels, there is an adaptive identification equalization processing method, which can identify two channel categories well. In order to reduce the influence of noise on blind channel identification, there is a subspace tracking method based on recursive least squares, but this method is very sensitive to impulse noise in actual channel scenarios. There is also a method for channel scenario identification using a robust statistical subspace tracking method, which can identify three channel categories. For indoor wireless channel scenarios, there is a channel state classification method based on channel strength indicators. This method can classify two channel scenarios under a specific channel environment, and the classification accuracy needs to be improved. However, in general, in outdoor communication, the transmitter has a certain distance from the base station, and there are phenomena such as reflection and refraction, and it is difficult to have a direct path. The channel is subject to the Rayleigh fading channel category.

The current wireless channel scenario identification methods have disadvantages of limited identification scope and limited identification categories. In view of the fact that the outdoor wireless channel scenario identification method has not been specifically studied, a wireless channel scenario identification method is proposed.

SUMMARY

In view of the above shortcomings or disadvantages to be improved of the conventional technologies, the disclosure proposes a wireless channel scenario identification method and system, which use the feature extraction method including the use of the autocorrelation function and the Fourier transform and are able to extract the power spectral density function well from different wireless channel scenario categories. The wireless channel scenario identification method and system also combine an artificial intelligence deep learning algorithm having powerful classification capabilities, are able to classify different wireless channel scenarios, and have a better identification effect.

In order to achieve the above, according to one aspect of the disclosure, a wireless channel scenario identification method is provided, including:

(1) building a wireless channel scenario model, simulating different wireless channel scenarios according to the wireless channel scenario model, and collecting a passband signal for each of the wireless channel scenarios and performing preprocessing on the passband signal to obtain a channel scenario baseband signal;

(2) extracting a feature parameter of the channel scenario baseband signal by using an autocorrelation method, and extracting an autocorrelation function of the channel scenario baseband signal;

(3) performing a Fourier transform on the autocorrelation function to obtain a power spectral density function, and performing normalizing processing on the power spectral density function to obtain a normalized channel scenario power spectral density function; and (4) designing a deep learning network, using the normalized channel scenario power spectral density function and a corresponding scenario category label as an input of the deep learning network, training the deep learning network, and using the trained deep learning network to identify a channel scenario to be identified.

Preferably, simulating different wireless channel scenarios according to the wireless channel scenario model includes:

initializing a relevant parameter and using a flat filter method to generate different wireless channel scenarios by inputting two Gaussian white noise random sequences to a flat filter to generate colored Gaussian white noise random sequences, respectively, to form a real part and an imaginary part of different wireless channel scenarios;

obtaining a passband signal $\tilde{y}(t)=\text{Re}[y(t)e^{j2\pi f_c t}]=h_I(t)\cos(2\pi f_c t)+h_Q(t)\sin(2\pi f_c t)$ at an output end, where $y(t)$ represents a baseband received signal, $h_I(t)$ represents an in-phase component, $h_Q(t)$ represents a quadrature component, and $f_c$ is a carrier frequency; and performing first-order and second-order statistical analyses on different wireless channel scenarios.

Preferably, performing preprocessing on the passband signal includes:

obtaining a baseband received signal $y(t)_{pq}$ of the passband signal by $$y(t)_{pq} = \sum_{i=1}^{I} C_i e^{-j\phi_i(t)} x(t-\tau_i),$$

where $\phi_i(t)=2\pi\{(f_c+f_i)\tau_i-f_i\tau_i\}$, $C_i$ and $\tau_i$ respectively represents a channel gain and a path delay of the i-th propagation path, $f_i$ represents a Doppler frequency shift, $$f_i = f_m \cos\theta_i = \frac{v}{\lambda}\cos\theta_i,$$

v represents a speed of a mobile station, $\lambda$ represents a wavelength of the mobile station, $f_m$ represents a maximum Doppler frequency shift, $\theta_i$ represents an arrival angle of the i-th plane wave, p represents the p-th wireless channel scenario, q represents the q-th channel passband signal of the p-th wireless channel scenario, and I represents the number of propagation paths;

modeling $y(t)_{pq}$ as a linear time-varying filter to obtain a complex baseband impulse response of the filter:

$$h(t,\tau)_{pq} = \sum_{i=1}^{I} C_i e^{-j\phi_i(t)} \delta(t,\tau_i),$$

where $\delta_i(\cdot)$ is a Dirac function, and when a difference between a sampling period and the path delay is greater than a preset threshold, the path delay $\tau_i$ is expressed approximately as $\tilde{\tau}$, and $h(t,\tau)_{pq}$ is expressed as $h(t,\tau)_{pq}=h(t)_{pq}\delta(t-\tilde{\tau})$, where $$h(t)_{pq} = \sum_{i=1}^{I} C_i e^{-j\phi_i(t)}, \tilde{\tau} = \frac{\sum_i a_i^2 \tau_i}{\sum_i a_i^2},$$

and $a_i$ is an amplitude of the i-th path; and setting a baseband transmission signal as $x(t)=1$, then a passband received signal $\tilde{y}(t)_{pq}$ being expressed as:

$$\tilde{y}(t)_{pq} = \text{Re}[y(t)_{pq}e^{j2\pi f_c t}] =$$
$$\text{Re}[\{h_I(t)_{pq}+jh_Q(t)_{pq}\}e^{j2\pi f_c t}] = h_I(t)_{pq}\cos(2\pi f_c t)+h_Q(t)_{pq}\sin(2\pi f_c t),$$

where $h_I(t)_{pq}$ and $h_Q(t)_{pq}$ are respectively an in-phase component and a quadrature component of $$h(t)_{pq}, h_I(t)_{pq} = \sum_{i=1}^{I} C_i(t)\cos\phi_i(t), h_Q(t)_{pq} = \sum_{i=1}^{I} C_i(t)\sin\phi_i(t),$$

$$\phi_i(t) == 2\pi f_c\tau_i(t) - \phi_{D_i} - \phi_0, \phi_0$$

is a phase offset, and $\phi_{D_i}$ is a time delay.

Preferably, the step (2) includes:
obtaining an autocorrelation function $A_{h_I}(\tau)_{pq}$ for the in-phase component $h_I(t)_{pq}$:

$$A_{h_I}(\tau) = E[h_I(t)h_I(t+\tau)] = \sum_i E[C_i^2]E[\cos\phi_i(t)\cos\phi_i(t+\tau)] =$$
$$\frac{P_h}{2\pi}\int \cos(2\pi v\tau \cos(\theta/\lambda))d\theta = P_h J_0(2\pi f_D \tau),$$

where $P_h$ is a power of a received signal, $J_0(x)$ is a Bayesian function, $$J_0(x) = \frac{1}{\pi}\int_0^{\pi} e^{-jx\cos\theta}d\theta,$$

$f_D$ represents a maximum Doppler shift, and $\theta$ represents a wave arrival angle;

obtaining a cross-correlation function $A_{h_I,H_Q}(\tau)_{pq}$ for the in-phase component $h_I(t)_{pq}$ and the quadrature component $h_Q(t)_{pq}$:

$$A_{h_I,h_Q}(\tau)_{pq} = E[h_I(t)_{pq}h_Q(t+\tau)_{pq}] =$$
$$-5\sum_i E[C_i^2]\sin(2\pi v\tau \cos\theta_i/\lambda) = -E[h_Q(t)_{pq}h_I(t+\tau)_{pq}];$$

and
obtaining an autocorrelation function $A_h(\tau)_{pq}$ of the complex baseband impulse response $h(t,\tau)$: $A_h(\tau)_{pq}=E[h(t)_{pq}h(t+\tau)_{pq}]=A_{h_I}(\tau)_{pq}\cos(2\pi f_c\tau)+A_{h_I,h_Q}(\tau)_{pq}\sin(2\pi f_c\tau)$.

Preferably, the step (3) includes:
performing a Fourier transform on the autocorrelation function $A_{h_I}(\tau)_{pq}$ of the in-phase component $h_I(t)_{pq}$ to obtain a power spectral density function $S_{h_I}(f)_{pq}$, where $S_{h_I}(f)_{pq}=S_{h_Q}(f)_{pq}=F[A_{h_I}(\tau)_{pq}]$, $S_{h_Q}(f)_{pq}$ represents the power spectral density function of the autocorrelation function of the quadrature component $h_Q(t)_{pq}$;

performing a Fourier transform on the autocorrelation function $A_h(\tau)_{pq}$ of the complex baseband impulse response $h(t,\tau)_{pq}$ to obtain a power spectral density function $S_h(f)_{pq}$, where $S_h(f)_{pq}=F[A_h(\tau)_{pq}]=25[S_{h_I}(f-f_c)_{pq}+S_{h_I}(f+f_c)_{pq}]$, and $f_c$ is a carrier frequency; and performing normalizing processing on $S_h(f)_{pq}$ to obtain a normalized power spectral density function $\overline{S}_h(f)_{pq}$, where $$\overline{S}_h(f)_{pq} = \frac{S_h(f)_{pq}}{\sum_{l=1}^{p} S_h(f)_{lq}}.$$

Preferably, designing the deep learning network includes:
using a deep belief network to build a wireless channel scenario identification classifier based on deep learning, the wireless channel scenario identification classifier including an input layer $h_0$, an output layer O and N hidden layers $h^1$, $h^2$, L, $h_n$, and the number of units of the input layer $h^0$ is equal to the dimension of input features and is set to the number of vector features of the input features, and the number of units of the output layer O is equal to the total number of wireless channel scenario categories, and the last hidden layer $h''$ is composed of quantum units which have multiple levels of representation capabilities, and the other hidden layers are all composed of sigmoid units.

Preferably, using the trained deep learning network to identify the channel scenario to be identified includes:
for the wireless channel scenario to be identified, collecting a passband signal at a receiving end and performing preprocessing on the passband signal to obtain a channel scenario baseband signal;

extracting a feature parameter of the channel scenario baseband signal of the wireless channel scenario to be identified by using the autocorrelation method, and extracting an autocorrelation function of the channel scenario baseband signal of the wireless channel scenario to be identified;

performing a Fourier transform on the autocorrelation function of the channel scenario baseband signal of the wireless channel scenario to be identified to obtain a power spectral density function, and performing normalizing processing on the power spectral density function obtained by the Fourier transform to obtain a normalized channel scenario power spectral density function of the wireless channel scenario to be identified; and using the normalized channel scenario power spectral density function of the wireless channel scenario to be identified as an input of the trained classifier, and completing identification of the wireless channel scenario to be identified according to an output of the classifier.

Preferably, completing the identification of the wireless channel scenario to be identified according to the output of the classifier includes:

calculating a Euclidean distance between an output vector of the classifier and each wireless channel scenario category label vector, and taking a channel scenario corresponding to a minimum Euclidean distance as a determination category of the wireless channel scenario to be identified.

According to another aspect of the disclosure, a wireless channel scenario identification system is provided, including:

a modeling simulation and signal processing module configured to build a wireless channel scenario model, simulate different wireless channel scenarios according to the wireless channel scenario model, and collect a passband signal for each of the wireless channel scenarios and perform preprocessing on the passband signal to obtain a channel scenario baseband signal;

an autocorrelation obtaining module configured to extract a feature parameter of the channel scenario baseband signal by using an autocorrelation method, and extract an autocorrelation function of the channel scenario baseband signal;

a normalized channel scenario power spectral density obtaining module configured to perform a Fourier transform on the autocorrelation function to obtain a power spectral density function, and perform normalizing processing on the power spectral density function to obtain a normalized channel scenario power spectral density function; and a training identification module configured to design a deep learning network, use the normalized channel scenario power spectral density function and a corresponding scenario category label as an input of the deep learning network, train the deep learning network, and use the trained deep learning network to identify a channel scenario to be identified.

According to another aspect of the disclosure, a computer-readable storage medium with computer programs stored thereon is provided, and when the computer programs are executed by a processor, the wireless channel scenario identification method according to any one of the above paragraphs is implemented.

In general, compared with the conventional technologies, the above technical solutions provided by the disclosure can achieve the following beneficial effects: the disclosure uses the feature extraction method including the use of the autocorrelation function and the Fourier transform and is able to extract the power spectral density function well from different wireless channel scenario categories. The disclosure also combines an artificial intelligence deep learning algorithm having powerful classification capabilities, is able to classify different wireless channel scenarios, and expands the scope of channel scenario identification. The disclosure can extract feature parameters in complex wireless channel scenarios and has certain fault tolerance for different wireless channel environments.

BRIEF DESCRIPTION OF THE DRAWINGS

FIGS. 6A-6E show normalized power spectral density functions extracted in different wireless channel scenarios according to an embodiment of the disclosure.

DESCRIPTION OF THE EMBODIMENTS

In order to make the objectives, technical solutions, and advantages of the disclosure clearer, hereinafter, the disclosure will be further described in detail with reference to the accompanying drawings and embodiments. It should be understood that the specific embodiments described herein are only used to explain the disclosure, but are not intended to limit the disclosure. In addition, the technical features involved in the various embodiments of the disclosure described below may be combined with each other as long as they do not conflict with each other.

The disclosure provides a wireless channel scenario identification method to identify different wireless channel scenarios. The method combines the autocorrelation function and the Fourier transform to obtain the power spectral density functions of wireless channels and performs normalizing processing on them. The method also combines deep learning for further classification processing, builds a deep belief network, and combines the power spectral density functions and the category label pair as training data to finally realize identification of different wireless channel scenarios. The identification effect is good, and the identification accuracy is high.

Embodiment 1

Figure 1:
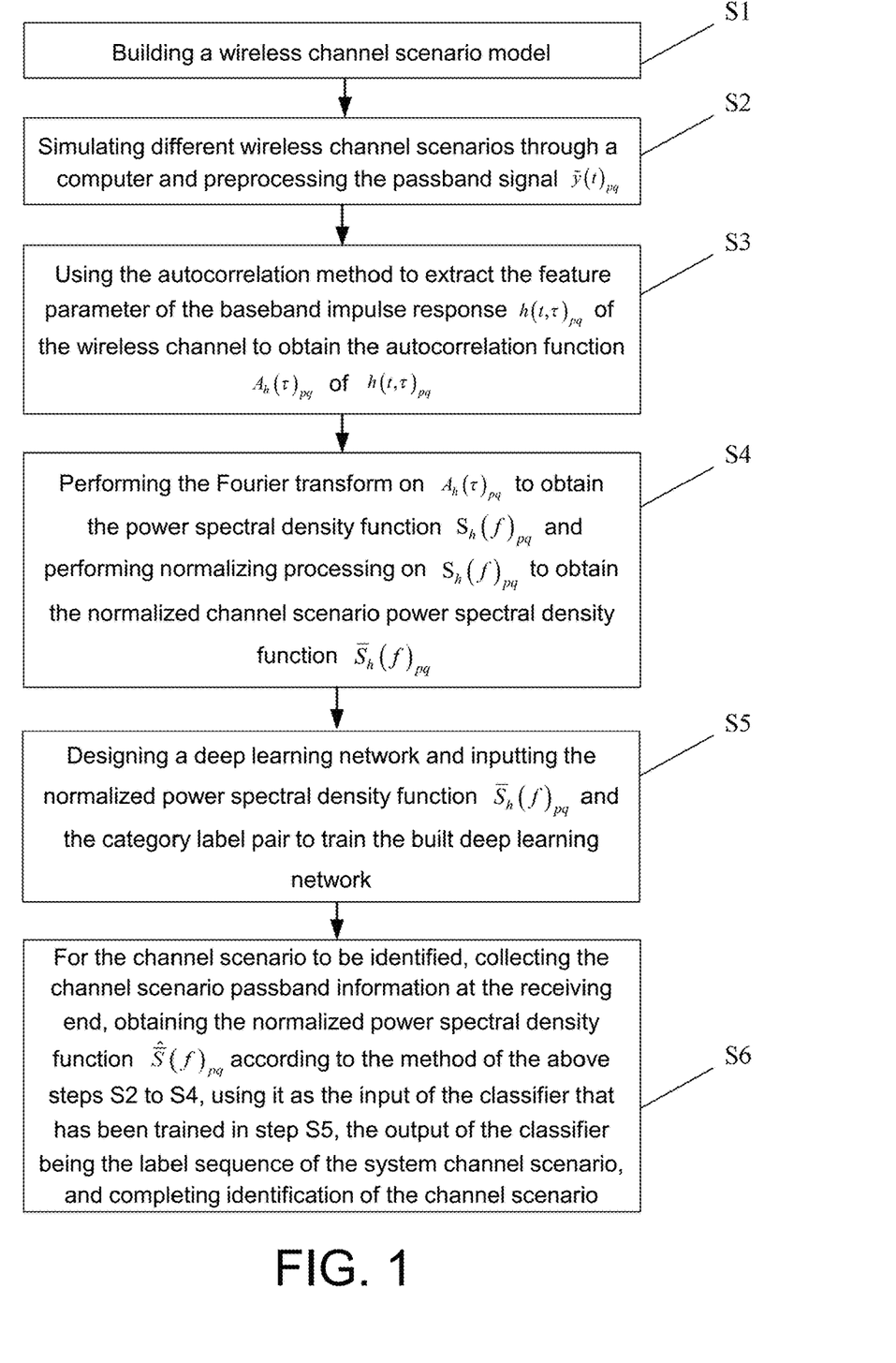
FIG. 1 is a schematic flow chart of a method according to an embodiment of the disclosure.

FIG. 1 is a schematic flow chart of a wireless channel scenario identification method according to an embodiment of the disclosure. As shown in FIG. 1, the wireless channel scenario identification method includes the following steps:

S1: A wireless channel scenario model is built. In wireless communication, the transmission signal is s(t)=A cos (2πf_ct), where A is the signal amplitude, $f_c$ is the carrier frequency, and t is time. A plane wave arrives at an angle θ, and the speed of the mobile station is v such that the wave arrives in the horizontal direction. x(t) is set as the baseband transmission signal, and then the corresponding passband transmission signal is $\tilde{x}(t)=Re[x(t)e^{j2\pi f_c t}]$, where Re[(t)] represents the real part of s(t). After passing through the scattering channel with I propagation paths, the passband received signal is $$\tilde{y}(t) = Re\left[\sum_{i=1}^{I} C_i e^{j2\pi(f_c+f_i)(t-\tau_i)} x(t-\tau_i)\right] = Re[y(t)e^{j2\pi f_c t}],$$

where y(t) represents the baseband received signal, $C_i$ and $\tau_i$ respectively represents the channel gain and the time delay of the i-th propagation path, and $f_i$ represents the Doppler frequency shift. With the speed v and wavelength λ of the mobile station, the Doppler frequency shift is expressed as $$f_i = f_m \cos\theta_i = \frac{v}{\lambda}\cos\theta_i,$$

where $f_m$ is the maximum Doppler frequency shift, and $\theta_i$ is the arrival angle of the i-th plane wave.

S2: Wireless channel scenarios are realized, and the passband signal $\tilde{y}(t)_{pq}$ is preprocessed. A flat filter method is used to generate different wireless channel scenarios, and the passband signal $\tilde{y}(t)_{pq}$ is collected and preprocessed, where p represents the p-th wireless channel scenario, and q represents the q-th channel passband signal. The baseband signal $y(t)_{pq}$ of the passband signal $\tilde{y}(t)_{pq}$ is obtained, and the complex baseband impulse response $h(t,\tau)_{pq}$ is obtained from the baseband signal $y(t)_{pq}$, and the complex baseband impulse response $h(t,\tau)_{pq}$ is used to obtain the in-phase component $h_I(t)_{pq}$ and the quadrature component $h_Q(t)_{pq}$ of $h(t,\tau)_{pq}$, where r represents the path delay.

S3: The autocorrelation function $A_h(t)_{pq}$ of the wireless channel is calculated. The autocorrelation function method is used to obtain the autocorrelation function $A_{h_I}(\tau)_{pq}$ for the in-phase component $h_I(t)_{pq}$, and to obtain the cross-correlation function $A_{h_I,h_Q}(\tau)_{pq}$ for the in-phase component $h_I(t)_{pq}$ and the quadrature component $h_Q(t)_{pq}$. Finally, the autocorrelation function $A_h(\tau)_{pq}$ for the complex baseband impulse response $h(t,\tau)_{pq}$ is obtained.

S4: The normalized power spectral density function $\overline{S}_h(f)_{pq}$ of $A_h(\tau)_{pq}$ is obtained. The Fourier transform is performed on the autocorrelation function $A_h(\tau)_{pq}$ of the complex baseband impulse response $h(t,\tau)_{pq}$ to obtain the power spectral density function $S_h(f)_{pq}$, and the normalized power spectral density function $\overline{S}_h(f)_{pq}$ is obtained by performing normalizing processing on $S_h(f)_{pq}$.

S5: The above steps S2 to S4 are repeated in sequence for different channel scenarios, and the obtained normalized power spectral density function $\overline{S}(t)_{pq}$ and the category label pair are used to build a training sample set as the input vector of a deep learning network classifier, and the corresponding category label serves as the output vector of the deep learning network to complete the training of the classifier.

S6: The passband signal is collected at the receiving end during the period of the wireless channel scenario to be identified in the above communication system, and the normalized power spectral density function $\tilde{\overline{S}}(t)_{pq}$ is calculated according to the above steps S2 to S4, which uses $\tilde{\overline{S}}(t)_{pq}$ as the input of the classifier that has been trained in step S5, and identification of the wireless channel scenario is completed according to the output of the classifier.

Figure 2:
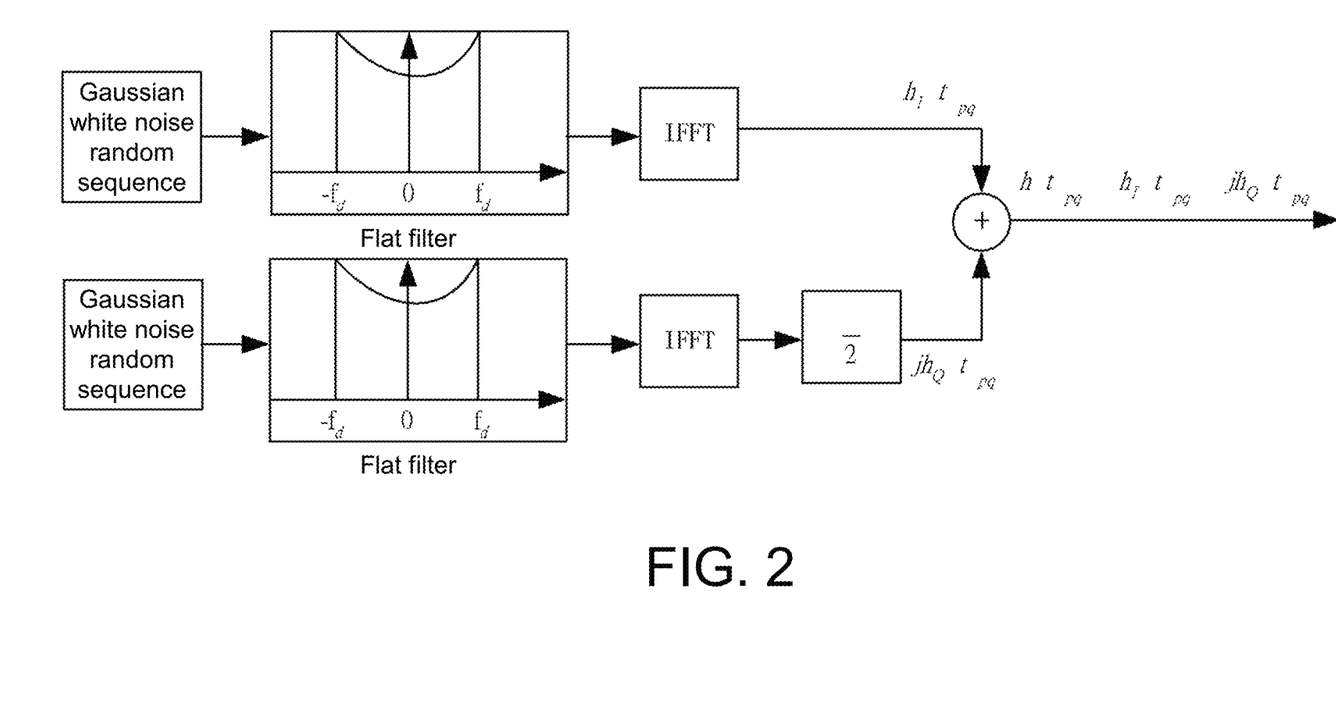
FIG. 2 is a flow chart of generating a wireless channel according to an embodiment of the disclosure.

In the embodiment of the disclosure, as shown in FIG. 2, the flat filter method is used to generate a wireless channel scenario in step S2, and the specific steps are as follows.

(a) Relevant parameters are initialized, including the system sampling frequency, the number of sampling points, and the maximum Doppler shift.

(b) The flat filter method is used to generate different wireless channel scenarios by inputting two Gaussian white noise random sequences to a flat filter to generate colored Gaussian white noise random sequences, respectively, to form a real part and an imaginary part of different wireless channel scenarios.

Figure 4:
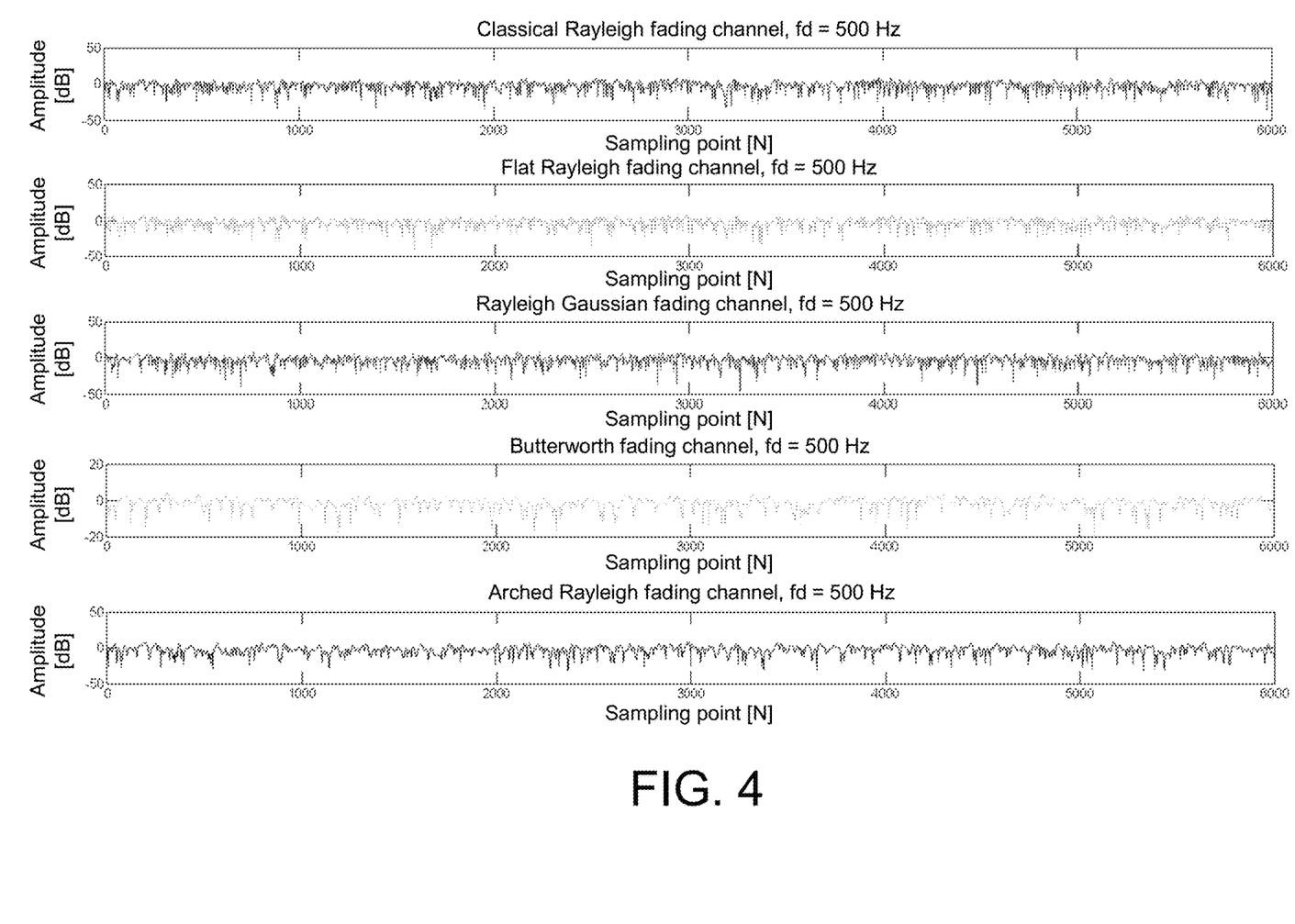
FIG. 4 shows time-domain amplitude diagrams of simulation results of different wireless channel scenarios according to an embodiment of the disclosure.

FIG. 4 shows time-domain amplitude diagrams of simulation results of different wireless channel scenarios according to an embodiment of the disclosure. As shown in FIG. 4, from top to bottom, the diagrams are a time-domain amplitude diagram of simulation results of a classical Rayleigh channel, a time-domain amplitude diagram of simulation results of a flat Rayleigh fading channel, a time-domain amplitude diagram of simulation results of a Rayleigh Gaussian fading channel, a time-domain amplitude diagram of simulation results of a Butterworth fading channel, and a time-domain amplitude diagram of simulation results of an arched Rayleigh fading channel. It can be seen from FIG. 4 that at the maximum Doppler shift $f_d$=500 Hz and at the sampling point of 6000, the time-domain waveforms of the five wireless channels show different characteristics.

(c) The passband signal $\tilde{y}(t)=Re[y(t)e^{j2\pi f_c t}]$ is obtained at the output end;
$\tilde{y}(t)=h_I(t)\cos(2\pi f_c t)+h_Q(t)\sin(2\pi f_c t)$, where $h_I(t)$ represents the in-phase component, and $h_Q(t)$ represents the quadrature component.

Figure 5:
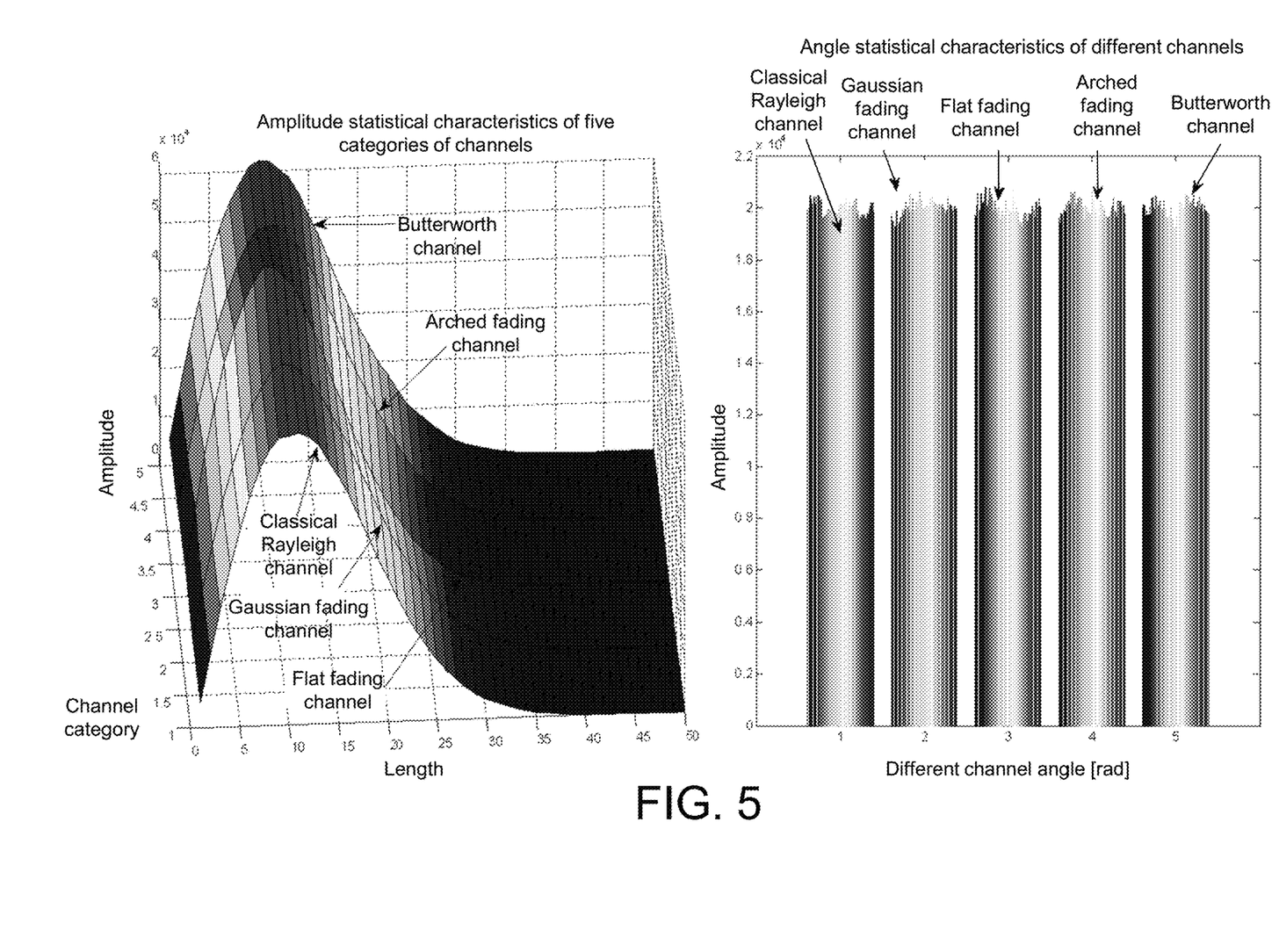
FIG. 5 shows first-order and second-order statistical characteristic diagrams of different wireless channel scenarios according to an embodiment of the disclosure.

(d) First-order and second-order statistical analyses are performed on different wireless channel scenarios, as shown in FIG. 5. The left part in FIG. 5 shows the amplitude statistical characteristics of the classical Rayleigh channel, the flat Rayleigh fading channel, the Rayleigh Gaussian fading channel, the Butterworth fading channel and the arched Rayleigh fading channel, and the first-order statistical characteristics of different channels obey a Rayleigh distribution. The right part in FIG. 5 shows the angle statistical characteristics of different channels, and the second-order angle statistical characteristics of different channel scenarios obey a uniform distribution. It can be concluded from FIG. 5 that all five simulated channels meet the requirements and can be used for wireless channel identification tests.

In the embodiment of the disclosure, the passband signal p(t) is preprocessed in step S2, and the specific steps are as follows.

(i) The baseband signal $y(t)_{pq}$ of the passband received signal $\tilde{y}(t)_{pq}$ is obtained. The formula $$y(t)_{pq} = \sum_{i=1}^{I} C_i e^{-j\phi_i(t)} x(t-\tau_i)$$

is used to obtain the baseband received signal $y(t)_{pq}$ of the passband, where $\phi_i(t)=2\pi\{(f_c+f_i)\tau_i-f_i\tau_i\}$, $C_i$ and $\tau_i$ respectively represents the channel gain and the time delay of the i-th propagation path, and $f_i$ represents the Doppler frequency shift. For the speed v and wavelength λ of the mobile station, the Doppler frequency shift is expressed as $$f_i = f_m \cos \theta_i = \frac{v}{\lambda} \cos \theta_i,$$

where $f_m$ is the maximum Doppler frequency shift, and $\theta_i$ is the arrival angle of the i-th plane wave.

(ii) The complex baseband impulse response $h(t,\tau)_{pq}$ of the filter is obtained. $y(t)_{pq}$ is modeled as a linear time-varying filter to obtain the complex baseband impulse response of the filter:

$$h(t,\tau)_{pq} = \sum_{i=1}^{I} C_i e^{-j\phi_i(t)} \delta(t,\tau_i),$$

where $C_i$ and $\tau_i$ respectively represents the channel gain and the path delay of the i-th propagation path, and $\tau_i(\cdot)$ is the Dirac function. When the difference between the sampling period and the path delay is greater than a preset threshold, the path delay $\tau_i$ can be expressed approximately as $\tilde{\tau}$, and $h(t,\tau)_{pq}$ can be expressed as $h(t,\tau)_{pq} = h(t)_{pq}\delta(t-\tilde{\tau})$, where $$h(t)_{pq} = \sum_{i=1}^{I} C_i e^{-j\phi_i(t)}, \tilde{\tau} = \frac{\sum_i a_i^2 \tau_i}{\sum_i a_i^2},$$

and $a_i$ is the amplitude of the i-th path.

The preset threshold can be determined according to actual needs to ensure that the sampling period is much greater than the path delay. The specific value of the preset threshold is not particularly limited in the embodiment of the disclosure.

(iii) The in-phase component $h_I(t)_{pq}$ and the quadrature component $h_Q(t)_{pq}$ of $h(t)_{pq}$ are obtained. The baseband transmission signal is set to $x(t)=1$, and then the passband received signal $\tilde{y}(t)_{pq}$ can be expressed as:

$$\tilde{y}(t)_{pq} = \text{Re}[y(t)_{pq} e^{j2\pi f_c t}] =$$
$$\text{Re}[\{h_I(t)_{pq} + jh_Q(t)_{pq}\}e^{j2\pi f_c t}] = h_I(t)_{pq}\cos(2\pi f_c t) + h_Q(t)_{pq}\sin(2\pi f_c t),$$

where $h_I(t)_{pq}$ and $h_Q(t)_{pq}$ are respectively the in-phase component and the quadrature component of $$h(t)_{pq}, h_I(t)_{pq} = \sum_{i=1}^{I} C_i(t)\cos\phi_i(t), \text{ and } h_Q(t)_{pq} = \sum_{i=1}^{I} C_i(t)\sin\phi_i(t).$$

In the embodiment of the disclosure, the autocorrelation method is used to obtain the autocorrelation function $A_h(t)_{pq}$ of the wireless channel in step S3, and the specific steps are as follows.

(3.1) The autocorrelation function $A_{h_I}(\tau)_{pq}$ for the in-phase component $h_I(t)_{pq}$ is obtained:

$$A_{h_I}(\tau) = E[h_I(t)h_I(t+\tau)] = \sum_i E[C_i^2]E[\cos\phi_i(t)\cos\phi_i(t+\tau)] =$$
$$\frac{P_h}{2\pi}\int \cos(2\pi v\tau \cos(\theta/\lambda))d\theta = P_h J_0(2\pi f_D \tau),$$

where $P_h$ is the power of the received signal, $J_0(x)$ is the Bayesian function, $$J_0(x) = \frac{1}{\pi}\int_0^{\pi} e^{-jx\cos\theta}d\theta,$$

$f_D$ represents the maximum Doppler shift, and $\theta$ represents the wave arrival angle.

(3.2) The cross-correlation function $A_{h_I,h_Q}(\tau)_{pq}$ for the in-phase component $h_I(t)_{pq}$ and the quadrature component $h_Q(t)_{pq}$ is obtained.

(3.3) The autocorrelation function $A_h(\tau)_{pq}$ of the complex baseband impulse response $h(t,\tau)_{pq}$ is obtained: $A_h(\tau)_{pq} = E[h(t)_{pq} h(t+\tau)_{pq}] = A_{h_I}(\tau)_{pq}\cos(2\pi f_c \tau) + A_{h_I,h_Q}(\tau)_{pq}\sin(2\pi f_c \tau)$.

In the embodiment of the disclosure, the specific implementation steps of obtaining the normalized power spectral density function $\overline{S}_h(f)_{pq}$ of $A_h(\tau)_{pq}$ in step S4 are as follows.

(4.1) The Fourier transform is performed on the autocorrelation function $A_{h_I}(\tau)_{pq}$ of the in-phase component $h_I(t)_{pq}$ to obtain the power spectral density function $S_{h_I}(f)_{pq}$: $S_{h_I}(f)_{pq} = S_h(f)_{pq} = F[A_{h_I}(\tau)_{pq}]$, where $S_{h_Q}(f)_{pq}$ represents the power spectral density function of the autocorrelation function of the quadrature component $h_Q(t)_{pq}$.

(4.2) The Fourier transform is performed on the autocorrelation function $A_h(\tau)_{pq}$ of the complex baseband impulse response $h(t,\tau)_{pq}$ to obtain the power spectral density function $S_h(f)_{pq}$: $S_h(f)_{pq} = F[A_h(\tau)_{pq}] = 25[S_{h_I}(f-f_c)_{pq} + S_{h_I}(f+f_c)_{pq}]$, where $f_c$ is the carrier frequency.

(4.3) Normalizing processing is performed on $S_h(f)_{pq}$ to obtain the normalized power spectral density function $$\overline{S}_h(f)_{pq} \cdot \overline{S}_h(f)_{pq} = \frac{S_h(f)_{pq}}{\sum_{l=1}^{p} S_h(f)_{lq}}.$$

Figure 6A:
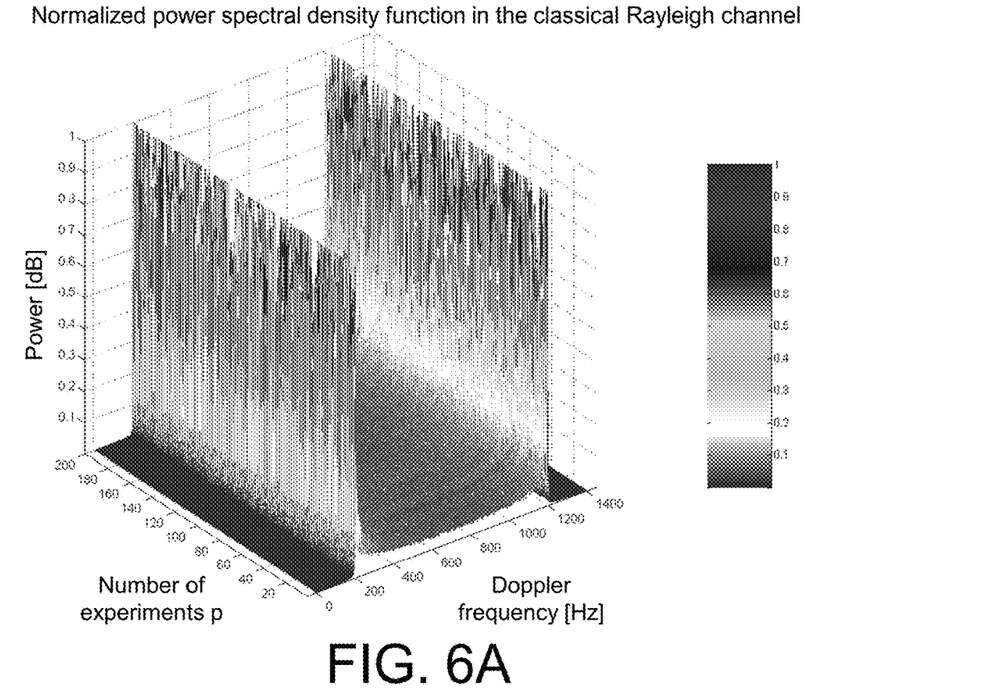
FIG. 6A shows the normalized power spectral density function in the classical Rayleigh channel.
Figure 6B:
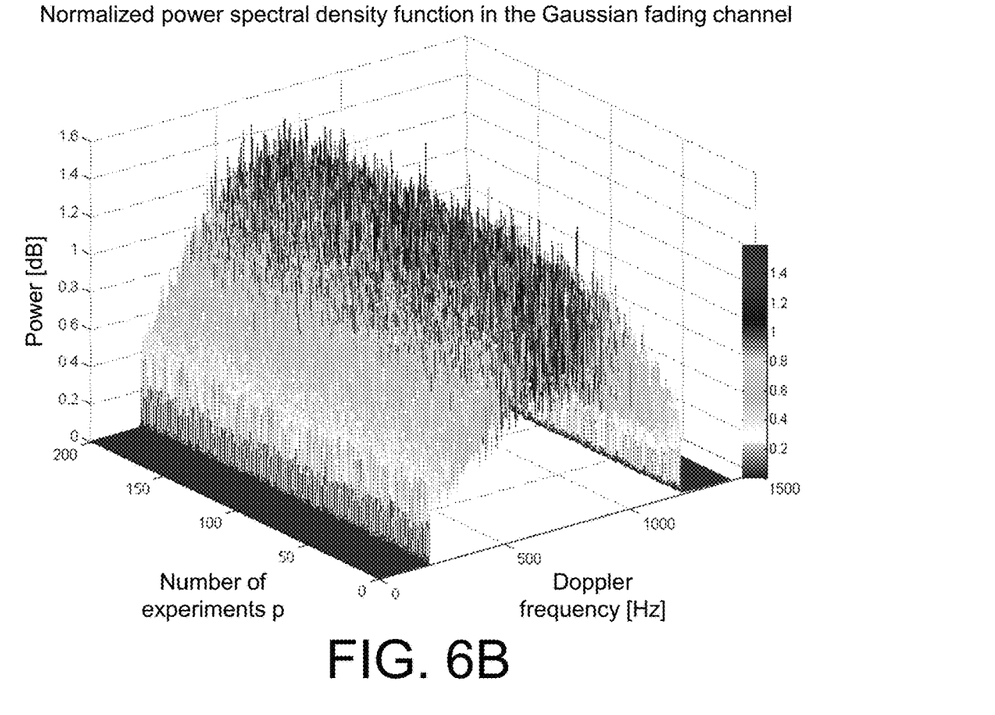
FIG. 6B shows the normalized power spectral density function in the Gaussian fading channel.
Figure 6C:
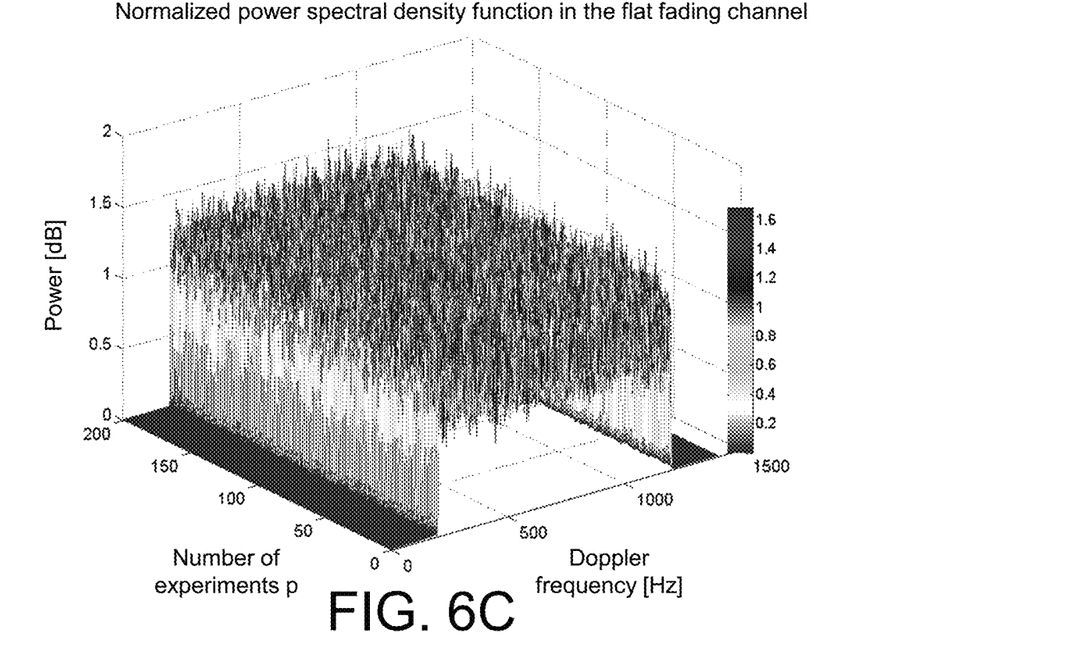
FIG. 6C shows the normalized power spectral density function in the flat fading channel.
Figure 6D:
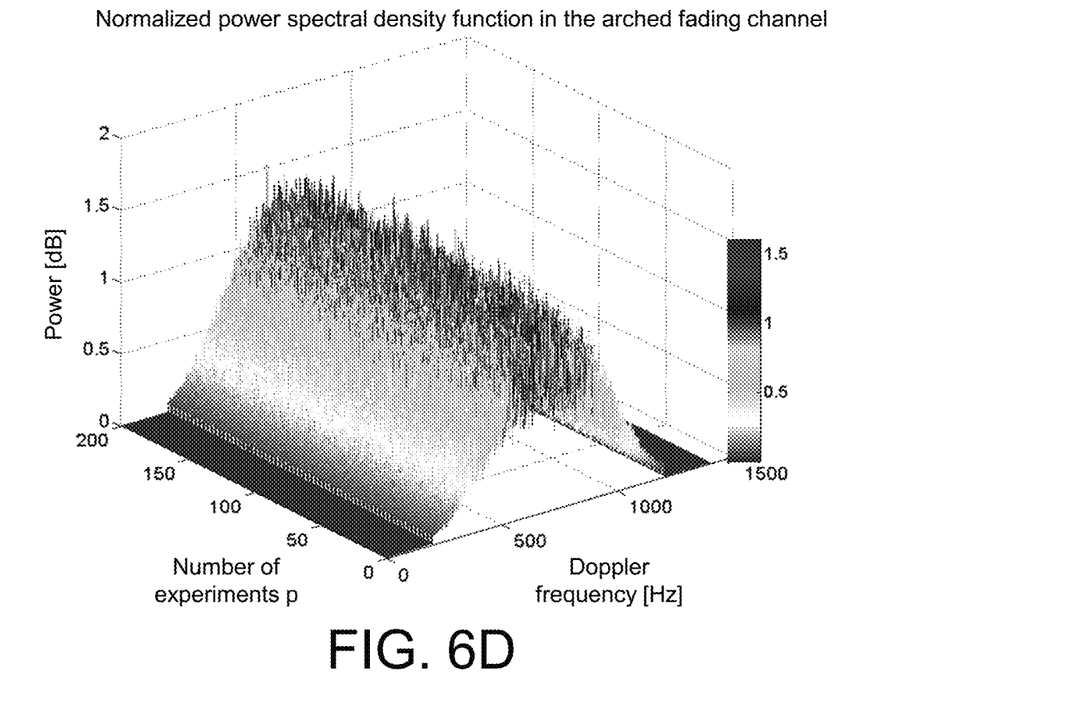
FIG. 6D shows the normalized power spectral density function in the arched fading channel.
Figure 6E:
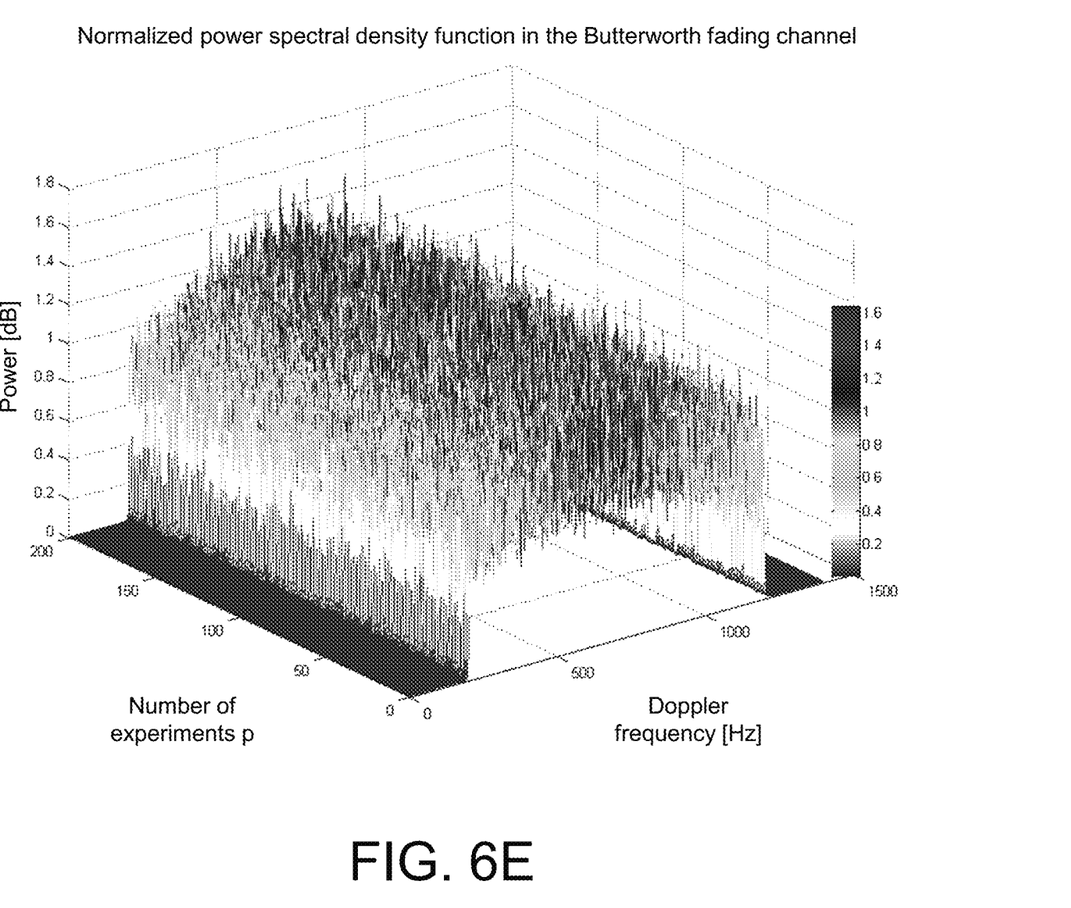
FIG. 6E shows the normalized power spectral density function in the Butterworth fading channel.

FIGS. 6A-6E show normalized power spectral density functions extracted in different wireless channel scenarios according to an embodiment of the disclosure. FIG. 6A shows the normalized power spectral density functions in the classical Rayleigh channel; FIG. 6B shows the normalized power spectral density functions in the Gaussian fading channel; FIG. 6C shows the normalized power spectral density functions in the flat fading channel; FIG. 6D shows the normalized power spectral density functions in the arched fading channel; and FIG. 6E shows the normalized power spectral density functions in the Butterworth fading channel. It can be seen from FIGS. 6A-6E that the normalized power spectral density functions extracted from different wireless channel scenarios are different and have strong feature differences, and the normalized power spectral density functions extracted from the same wireless channel scenario are substantially the same, indicating that the feature parameter can be used to well identify different wireless channel scenarios.

In the embodiment of the disclosure, the specific implementation steps of building a wireless channel scenario identification classifier based on deep learning in step S5 are as follows.

Figure 3:
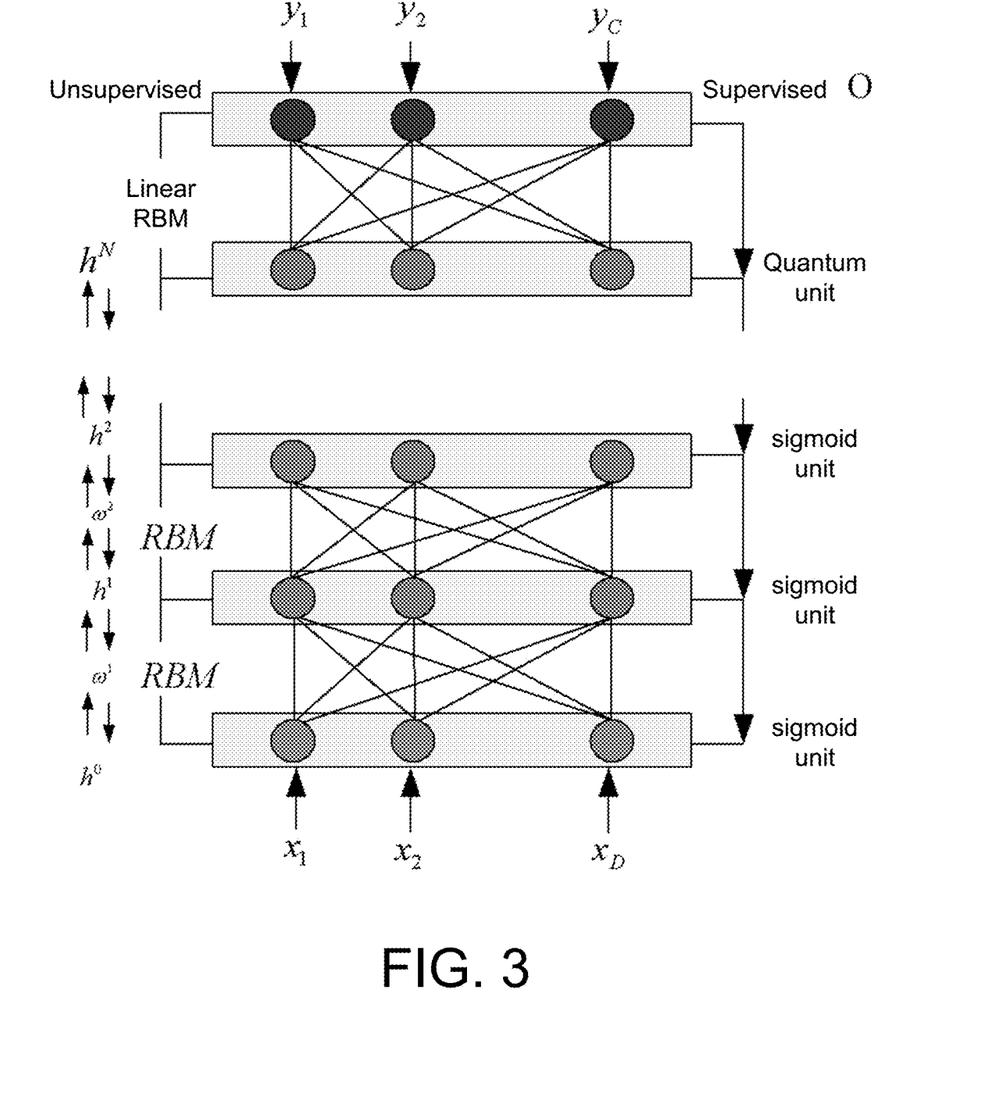
FIG. 3 is a diagram of a deep belief network architecture according to an embodiment of the disclosure.

As shown in FIG. 3, a deep belief network is used to build a wireless channel scenario identification classifier based on deep learning, which includes an input layer $h_0$, an output layer O and N hidden layers $h_1$, $h^2$, L, $h^n$. The number of units of the input layer $h^0$ is equal to the dimension of the input features and is set to the number of vector features of the input features. The number of units of the output layer O is equal to the total number of wireless channel scenario categories. The last hidden layer h″ is composed of quantum units which have multiple levels of representation capabilities, and the other hidden layers are all composed of sigmoid units.

In the embodiment of the disclosure, in step S6, the determination of the wireless channel scenario is completed according to the output of the classifier, in which the Euclidean distance between the output vector of the classifier and the label vector of each wireless channel scenario is calculated, and the channel scenario corresponding to the minimum Euclidean distance is taken as the output determination.

Figure 7:
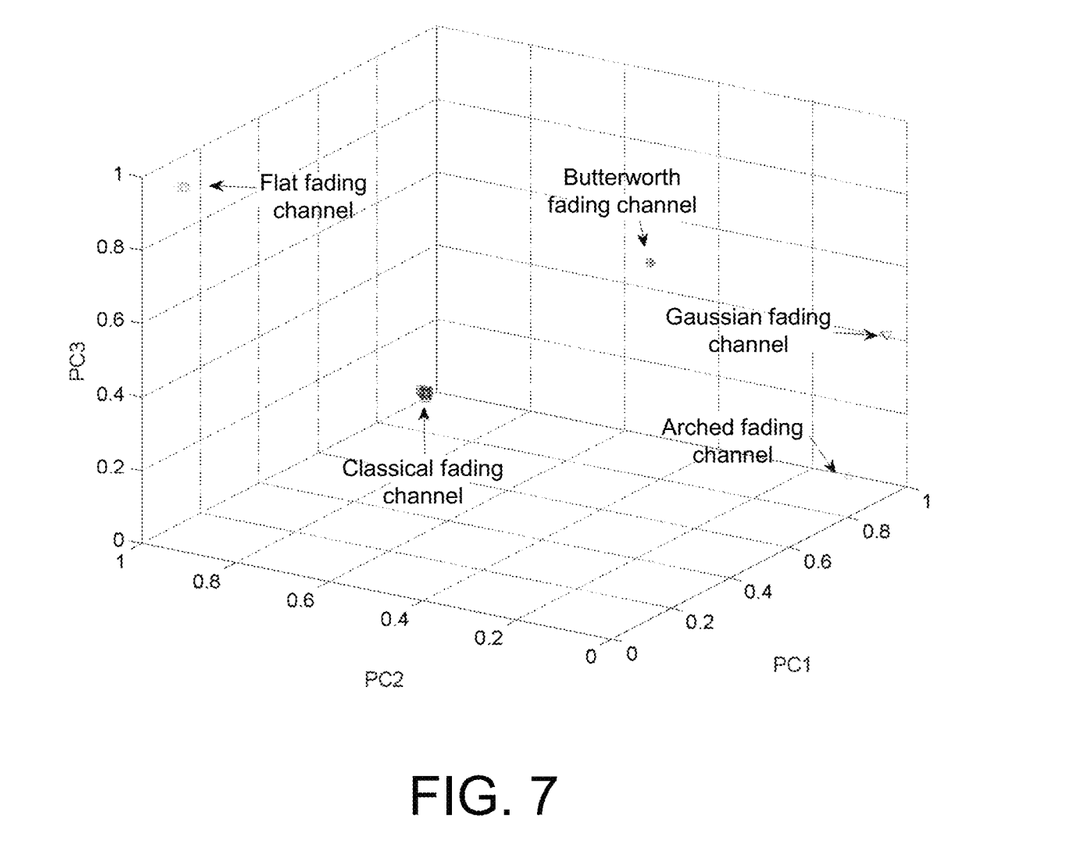
FIG. 7 is a three-dimensional feature result diagram of identifying different wireless channel scenarios according to an embodiment of the disclosure.

FIG. 7 is a three-dimensional feature result diagram of identifying different wireless channel scenarios according to an embodiment of the disclosure. As shown in FIG. 7, it can be seen from FIG. 7 that different wireless channel scenarios are identified in different three-dimensional spatial ranges, and the same channel scenarios are accurately identified and clustered into a certain spatial range, which shows that the disclosure has a good identification effect for different wireless channel scenarios.

In the embodiment of the disclosure, a wireless channel scenario identification method is provided. First, a wireless channel scenario model is built, and different wireless channel scenarios are simulated through a computer to obtain a channel scenario baseband signal $y(t)_{pq}$. Second, the autocorrelation method is used to extract the feature parameter of $y(t)_{pq}$, and the autocorrelation function $A_h(t)_{pq}$ is extracted, and the Fourier transform is performed on $A_h(t)_{pq}$ to obtain the power spectral density function $S(t)_{pq}$, and then the normalizing processing is performed on $S(t)_{pq}$ to obtain the normalized channel scenario power spectral density function $\overline{S}(t)_{pq}$. And then a deep learning network is designed, and the normalized power spectral density function $\overline{S}(t)_{pq}$ and the category label pair are input to train the built deep learning network. Finally, for the system with a channel scenario to be identified, the passband signal is collected at its receiving end, and the normalized scenario power spectral density function $\overline{S}(t)_{pq}$ is obtained according to the method of the above steps, and $\overline{S}(t)_{pq}$ is used as the input of the trained classifier, and the output of the classifier is the label sequence of the channel scenario, and the determination of the channel scenario is completed. The disclosure can classify and identify multiple wireless channel scenarios, and expand the scope of wireless channel scenario identification. It has robustness and good generalization ability for independently and identically distributed Rayleigh channels, and can achieve good classification and identification effects. Feature parameters can be extracted in complex wireless channel scenarios, and the learning and training of the classifier is simple, and the wireless channel scenario classification is reliable and effective.

Embodiment 2

Figure 8:
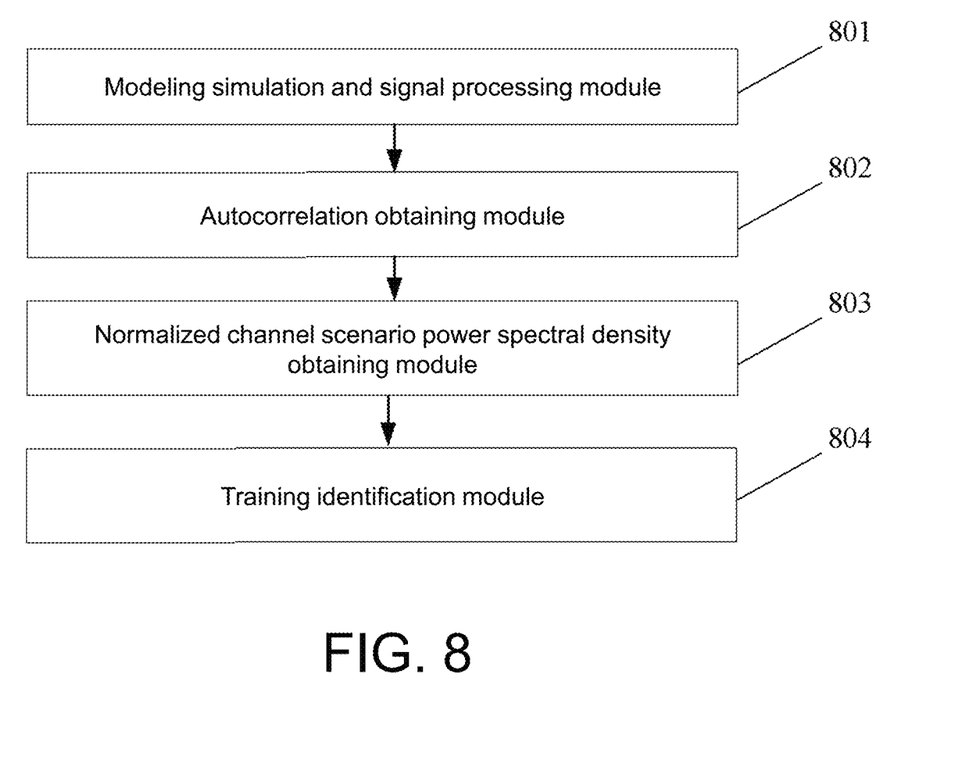
FIG. 8 is a schematic structure diagram of a system according to an embodiment of the disclosure.

FIG. 8 is a schematic structure diagram of a system according to an embodiment of the disclosure. As shown in FIG. 8, the system includes:

a modeling simulation and signal processing module 801 configured to build a wireless channel scenario model, simulate different wireless channel scenarios according to the wireless channel scenario model, and collect a passband signal for each of the wireless channel scenarios and perform preprocessing on the passband signal to obtain a channel scenario baseband signal;

an autocorrelation obtaining module 802 configured to extract a feature parameter of the channel scenario baseband signal by using an autocorrelation method, and extract an autocorrelation function of the channel scenario baseband signal;

a normalized channel scenario power spectral density obtaining module 803 configured to perform a Fourier transform on the autocorrelation function to obtain a power spectral density function, and perform normalizing processing on the power spectral density function to obtain a normalized channel scenario power spectral density function; and a training identification module 804 configured to design a deep learning network, use the normalized channel scenario power spectral density function and a corresponding scenario category label as an input of the deep learning network, train the deep learning network, and use the trained deep learning network to identify a channel scenario to be identified.

Regarding the specific implementation of each module, reference may be made to the description of the above method embodiment, and this embodiment of the disclosure will not repeat the details.

In the embodiment of the disclosure, a wireless channel scenario identification system is provided. First, a wireless channel scenario model is built, and different wireless channel scenarios are simulated through a computer to obtain a channel scenario baseband signal $y(t)_{pq}$. Second, the autocorrelation method is used to extract the feature parameter of $y(t)_{pq}$, and the autocorrelation function $A_h(t)_{pq}$ is extracted, and the Fourier transform is performed on $A_h(t)_{pq}$ to obtain the power spectral density function $S(t)_{pq}$, and then the normalizing processing is performed on $S(t)_{pq}$ to obtain the normalized channel scenario power spectral density function $\overline{S}(t)_{pq}$. And then a deep learning network is designed, and the normalized power spectral density function $\overline{S}(t)_{pq}$ and the category label pair are input to train the built deep learning network. Finally, for the system with a channel scenario to be identified, the passband signal is collected at its receiving end, and the normalized scenario power spectral density function $\overline{S}(t)_{pq}$ is obtained according to the method of the above steps, and $\overline{S}(t)_{pq}$ is used as the input of the trained classifier, and the output of the classifier is the label sequence of the channel scenario, and the determination of the channel scenario is completed. The disclosure can classify and identify multiple wireless channel scenarios, and expand the scope of wireless channel scenario identification. It has robustness and good generalization ability for independently and identically distributed Rayleigh channels, and can achieve good classification and identification effects. Feature parameters can be extracted in complex wireless channel scenarios, and the learning and training of the classifier is simple, and the wireless channel scenario classification is reliable and effective.

Embodiment 3

The disclosure also provides a computer-readable storage medium, such as a flash memory, a hard disk, a multimedia card, a card-type memory (e.g., an SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a disk, a compact disc, a server, an App store, etc., on which computer programs are stored, and when the programs are executed by a processor, the wireless channel scenario identification method in the method embodiment is implemented.

It should be noted that according to the needs of implementation, each step/component described in the disclosure may be split into more steps/components, or two or more steps/components or partial operations of steps/components may be combined into new steps/components to implement the disclosure.

People skilled in the art may easily understand that the above descriptions are only exemplary embodiments of the disclosure and are not intended to limit the disclosure. Any modification, equivalent replacement, improvement and the like made within the spirit and principle of the disclosure shall all be included in the protection scope of the disclosure.

What is claimed is:

1. A wireless channel scenario identification method, comprising:
   (1) building a wireless channel scenario model, simulating different wireless channel scenarios according to the wireless channel scenario model, and collecting a passband signal for each of the wireless channel scenarios and performing preprocessing on the passband signal to obtain a channel scenario baseband signal;
   (2) extracting a feature parameter of the channel scenario baseband signal by using an autocorrelation method, and extracting an autocorrelation function of the channel scenario baseband signal;
   (3) performing Fourier transformation on the autocorrelation function to obtain a power spectral density function, and performing normalizing processing on the power spectral density function to obtain a normalized channel scenario power spectral density function; and
   (4) designing a deep learning network, using the normalized channel scenario power spectral density function and a corresponding scenario category label as an input of the deep learning network, training the deep learning network, and using the trained deep learning network to identify a channel scenario to be identified.

2. The wireless channel scenario identification method according to claim 1, wherein simulating the different wireless channel scenarios according to the wireless channel scenario model comprises:
   initializing a relevant parameter and using a flat filter method to generate the different wireless channel scenarios by inputting two Gaussian white noise random sequences to the flat filter to generate colored Gaussian white noise random sequences, respectively, to form a real part and an imaginary part of the different wireless channel scenarios;
   obtaining the passband signal $$\tilde{y}(t)=Re[y(t)e^{j2\pi f_c t}]=h_I(t)\cos(2\pi f_c t)+h_Q(t)\sin(2\pi f_c t)$$

at an output end, where y(t) represents a baseband received signal, $h_I(t)$ represents an in-phase component, $h_Q(t)$ represents a quadrature component, and $f_c$ is a carrier frequency; and
   performing first-order and second-order statistical analyses on the different wireless channel scenarios.

3. The wireless channel scenario identification method according to claim 2, wherein performing preprocessing on the passband signal comprises:
   obtaining the baseband received signal $y(t)_{pq}$ of the passband signal through $$y(t)_{pq} = \sum_{i=1}^{I} C_i e^{-j\phi_i(t)} x(t-\tau_i),$$

where $\phi_i(t)=2\pi\{(f_c+f_i)\pi_i-f_i\tau_i\}$, $C_i$ and $\tau_i$ respectively represents a channel gain and a path delay of the i-th propagation path, $f_i$ represents a Doppler frequency shift, $$f_i = f_m \cos\theta_i = \frac{v}{\lambda}\cos\theta_i,$$

v represents a speed of a mobile station, $\lambda$ represents a wavelength of the mobile station, $f_m$ represents a maximum Doppler frequency shift, $\theta_i$ represents an arrival angle of the i-th plane wave, p represents the p-th wireless channel scenario, q represents the q-th channel passband signal of the p-th wireless channel scenario, and I represents the number of propagation paths;

modeling $y(t)_{pq}$ as a linear time-varying filter to obtain a complex baseband impulse response of the filter:

$$h(t,\tau)_{pq} = \sum_{i=1}^{I} C_i e^{-j\phi_i(t)} \delta(t,\tau_i),$$

where $\tau_i(\bullet)$ is a Dirac function, and when a difference between a sampling period and the path delay is greater than a preset threshold, the path delay $\pi_i$ is expressed approximately as $\tilde{\tau}$ and $h(t,\tau)_{pq}$ is expressed as $h(t,\tau)_{pq}=h(t)_{pq}\delta(t-\tilde{\tau})$, $$h(t)_{pq} = \sum_{i=1}^{I} C_i e^{-j\phi_i(t)}, \tilde{\tau} = \frac{\sum_i a_i^2 \tau_i}{\sum_i a_i^2},$$

where and $\alpha_i$ is an amplitude of the i-th path; and
setting a baseband transmission signal as x(t)=1, then a passband received signal $\tilde{y}(t)_{pq}$ being expressed as:

$$\tilde{y}(t)_{pq} = Re[y(t)_{pq} e^{j2\pi f_c t}] =$$
$$Re[\{h_I(t)_{pq} + jh_Q(t)_{pq}\}e^{j2\pi f_c t}] = h_I(t)_{pq}\cos(2\pi f_c t) + h_Q(t)_{pq}\sin(2\pi f_c t),$$

where $h_I(t)_{pq}$ and $h_Q(t)_{pg}$ are respectively an in-phase component and a quadrature component of $$h(t)_{pq}, h_I(t)_{pq} = \sum_{i=1}^{I} C_i(t)\cos\phi_i(t),$$

$$h_Q(t)_{pq} = \sum_{i=1}^{I} C_i(t)\sin\phi_i(t), \phi_i(t) == 2\pi f_c \tau_i(t) - \phi_{D_i} - \phi_0, \phi_0$$

is a phase offset, and $\phi_{D_i}$ is a time delay.

4. The wireless channel scenario identification method according to claim 3, wherein the step (2) comprises:
   obtaining the autocorrelation function $A_{h_i}(\tau)_{pq}$ for the in-phase component $h(t)_{pq}$:

$$A_{h_I}(\tau) = E[h_I(t)h_I(t+\tau)] = \sum_i E[C_i^2]E[\cos\phi_i(t)\cos\phi_i(t+\tau)] =$$

$$\frac{P_h}{2\pi}\int \cos(2\pi v\tau \cos(\theta/\lambda))d\theta = P_h J_0(2\pi f_D\tau),$$

where $P_h$ is a power of a received signal, $J_0(x)$ is a Bayesian function, $$J_0(x) = \frac{1}{\pi}\int_0^\pi e^{-jx\cos\theta}d\theta,$$

$f_D$ represents a maximum Doppler shift, and e represents a wave arrival angle;

obtaining a cross-correlation function $A_{h_I,H_Q}(\tau)_{pq}$ for the in-phase component $h_I(t)_{pq}$ and the quadrature component $h_Q(t)_{pq}$:

$$A_{h_I,h_Q}(\tau)_{pq} = E[h_I(t)_{pq}h_Q(t+\tau)_{pq}] =$$

$$-5\sum_i E[C_i^2]\sin(2\pi v\tau \cos\theta_i/\lambda) = -E[h_Q(t)_{pq}h_I(t+\tau)_{pq}];$$

and obtaining an autocorrelation function $A_h(\tau)_{pq}$ of the complex baseband impulse response h $(t,\tau)_{pq}$:

$$A_h(\tau)_{pq}=E[h(t)_{pq}h(t+\tau)_{pq}]=A_{h_I}(\tau)_{pq}\cos(2\pi f_c\tau)+A_{h_I,h_Q}(\tau)_{pq}\sin(2\pi f_c\tau).$$

5. The wireless channel scenario identification method according to claim 4, wherein the step (3) comprises:

performing Fourier transformation on the autocorrelation function $A_{h_I,H_Q}(\tau)_{pq}$ of the in-phase component $h_I(t)_{pq}$ to obtain a power spectral density function $S_{h_I}(f)_{pq}$, where $S_{h_I}(f)_{pq}=S_{h_Q}(f)_{pq}=F[A_{h_I}(\tau)_{pq}]$, $S_{h_Q}(f)_{pq}$ represents the power spectral density function of the autocorrelation function of the quadrature component $h_Q(t)_{pq}$;

performing Fourier transformation on the autocorrelation function $A_h(\tau)_{pq}$ of the complex baseband impulse response $h(t,\tau)_{pq}$ to obtain a power spectral density function $S_h(f)_{pq}$, where $S_h(f)_{pq}=F[A_h(\tau)_{pq}]=25[S_{h_I}(f-f_c)_{pq}+S_{h_I}(f+f_c)_{pq}]$, and $f_c$ is a carrier frequency; and performing normalizing processing on $S_h(f)_{P_q}$ to obtain a normalized power spectral density function $\overline{S}_h(f)_{pq}$, where $$\overline{S}_h(f)_{pq} = \frac{S_h(f)_{pq}}{\sum_{l=1}^p S_h(f)_{lq}}.$$

6. The wireless channel scenario identification method according to claim 1, wherein designing the deep learning network comprises:

using a deep belief network to build a wireless channel scenario identification classifier based on deep learning, the wireless channel scenario identification classifier comprising an input layer $h_0$, an output layer O and N hidden layers $h^1, h^2, L, h^n$ wherein the number of units of the input layer $h^0$ is equal to the dimension of input features and is set to the number of vector features of the input features, the number of units of the output layer O is equal to the total number of wireless channel scenario categories, the last hidden layer $h^n$ is composed of quantum units which have multiple levels of representation capabilities, and the other hidden layers are all composed of sigmoid units.

7. The wireless channel scenario identification method according to claim 6, wherein using the trained deep learning network to identify the channel scenario to be identified comprises:

for the wireless channel scenario to be identified, collecting a passband signal at a receiving end and performing preprocessing on the passband signal to obtain a channel scenario baseband signal;

extracting a feature parameter of the channel scenario baseband signal of the wireless channel scenario to be identified by using the autocorrelation method, and extracting an autocorrelation function of the channel scenario baseband signal of the wireless channel scenario to be identified;

performing a Fourier transform on the autocorrelation function of the channel scenario baseband signal of the wireless channel scenario to be identified to obtain a power spectral density function, and performing normalizing processing on the power spectral density function obtained by the Fourier transform to obtain a normalized channel scenario power spectral density function of the wireless channel scenario to be identified; and using the normalized channel scenario power spectral density function of the wireless channel scenario to be identified as an input of the trained classifier, and completing identification of the wireless channel scenario to be identified according to an output of the classifier.

8. The wireless channel scenario identification method according to claim 7, wherein completing the identification of the wireless channel scenario to be identified according to the output of the classifier comprises:

calculating a Euclidean distance between an output vector of the classifier and each wireless channel scenario category label vector, and taking a channel scenario corresponding to a minimum Euclidean distance as a determination category of the wireless channel scenario to be identified.

9. A wireless channel scenario identification system, comprising:

a modeling simulation and signal processing module configured to build a wireless channel scenario model, simulate different wireless channel scenarios according to the wireless channel scenario model, and collect a passband signal for each of the wireless channel scenarios and perform preprocessing on the passband signal to obtain a channel scenario baseband signal;

an autocorrelation obtaining module configured to extract a feature parameter of the channel scenario baseband signal by using an autocorrelation method, and extract an autocorrelation function of the channel scenario baseband signal;

a normalized channel scenario power spectral density obtaining module configured to perform a Fourier transform on the autocorrelation function to obtain a power spectral density function, and perform normalizing processing on the power spectral density function to obtain a normalized channel scenario power spectral density function; and a training identification module configured to design a deep learning network, use the normalized channel scenario power spectral density function and a corresponding scenario category label as an input of the deep learning network, train the deep learning network, and use the trained deep learning network to identify a channel scenario to be identified.

10. A non-transitory computer-readable storage medium with computer programs stored thereon, wherein when the computer programs are executed by a processor, the wireless channel scenario identification method according to claim 1 is implemented.

* * * * *